US011790956B2

(12) United States Patent
Takazawa

(10) Patent No.: US 11,790,956 B2
(45) Date of Patent: Oct. 17, 2023

(54) ELECTRONIC DEVICE HAVING METAL MEMBER AND SCREW THAT ATTACHES CONNECTOR AND METAL MEMBER TO HOUSING

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Masahide Takazawa, Yokohama Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 17/686,696

(22) Filed: Mar. 4, 2022

(65) Prior Publication Data
US 2023/0087592 A1 Mar. 23, 2023

(30) Foreign Application Priority Data

Sep. 22, 2021 (JP) .................................. 2021-154720

(51) Int. Cl.
G11B 33/12 (2006.01)
G11B 5/012 (2006.01)
H01R 13/60 (2006.01)
G11B 5/48 (2006.01)

(52) U.S. Cl.
CPC ............ *G11B 33/122* (2013.01); *G11B 5/012* (2013.01); *H01R 13/60* (2013.01); *G11B 5/4806* (2013.01)

(58) Field of Classification Search
None
See application file for complete search history.

(56) References Cited

U.S. PATENT DOCUMENTS

| 4,679,883 | A | 7/1987 | Assini et al. | |
| 5,392,175 | A * | 2/1995 | Beecroft | G11B 33/122 |
| | | | | 360/99.25 |
| 6,482,031 | B1 | 11/2002 | Chen et al. | |
| 7,125,294 | B2 | 10/2006 | Bruno | |
| 7,572,130 | B1 | 8/2009 | Zhang | |
| 8,282,416 | B2 | 10/2012 | Imazu et al. | |
| 8,517,773 | B2 | 8/2013 | Lee et al. | |
| 9,118,152 | B2 | 8/2015 | Ho | |
| 2001/0049210 | A1 * | 12/2001 | Pinteric et al. | G11B 33/122 |
| | | | | 439/76.1 |
| 2003/0003809 | A1 * | 1/2003 | Maiers | G11B 33/122 |
| | | | | 439/629 |

* cited by examiner

Primary Examiner — Craig A. Renner
(74) Attorney, Agent, or Firm — Kim & Stewart LLP

(57) ABSTRACT

According to one embodiment, an electronic device includes a housing, a substrate, a connector, a metal member, a screw, first solder, and second solder. The substrate includes a first surface to which a second hole opens and a metal region to which a first hole opens. The region is provided on the first surface. The connector is provided with a third hole. The metal member is attached to the connector and includes a second surface to which a fourth hole opens and a joint inserted into the second hole. The screw attaches the connector and the metal member to the housing through the third hole and the fourth hole. The first solder joins the region and the second surface to each other. The second solder joins an inner surface of the second hole and the joint to each other.

10 Claims, 6 Drawing Sheets

ELECTRONIC DEVICE HAVING METAL MEMBER AND SCREW THAT ATTACHES CONNECTOR AND METAL MEMBER TO HOUSING

CROSS-REFERENCE TO RELATED APPLICATIONS

This application is based upon and claims the benefit of priority from Japanese Patent Application No. 2021-154720, filed on Sep. 22, 2021; the entire contents of which are incorporated herein by reference.

FIELD

Embodiments described herein relate generally to an electronic device.

BACKGROUND

An electronic device such as a hard disk drive (HDD) or a solid state drive (SSD) is connectable to an external device such as a personal computer through a connector conforming to, for example, Serial ATA (SATA) standard. Such a connector is mounted on a substrate located outside a housing of the electronic device.

The connector and the substrate are attached to each other using solder, for example. The solder may however, undergo concentration of stress due to various factors, which may result in decrease in durability of the solder.

DETAILED DESCRIPTION

According to one embodiment, an electronic device includes a housing, a substrate, a connector, a metal member, a screw, first solder, and second solder. The housing houses a component. The substrate is provided with a first hole and a second hole and includes a first surface and a metal region. The second hole opens to the first surface. The metal region is provided on the first surface. The first hole open to the metal region. The substrate is attached to the housing outside the housing and electrically connected to the component. The connector is provided with a third hole, mounted on the substrate outside the housing and configured to be connected to an external device. The metal member is provided with a fourth hole communicating with the first hole and the third hole. The metal member is attached to the connector and includes a second surface and a joint. The second surface faces the metal region. The fourth hole opens to the second surface. The joint is inserted into the second hole. The screw attaches the connector and the metal member to the housing through the third hole and the fourth hole. The first solder joins the metal region and the second surface to each other. The second solder joins a metal inner surface of the second hole and the joint to each other.

Hereinafter, one embodiment will be described with reference to FIGS. 1 to 6. In this disclosure, a plurality of expressions is used occasionally regarding components according to the embodiment and description on the components. The components and the description thereof are examples, and are not limited by the expressions in the present specification. Components can also be specified by different notations from those used in the present specification. Moreover, components can be described in terms that differ from the term used in the present specification.

Figure 1:
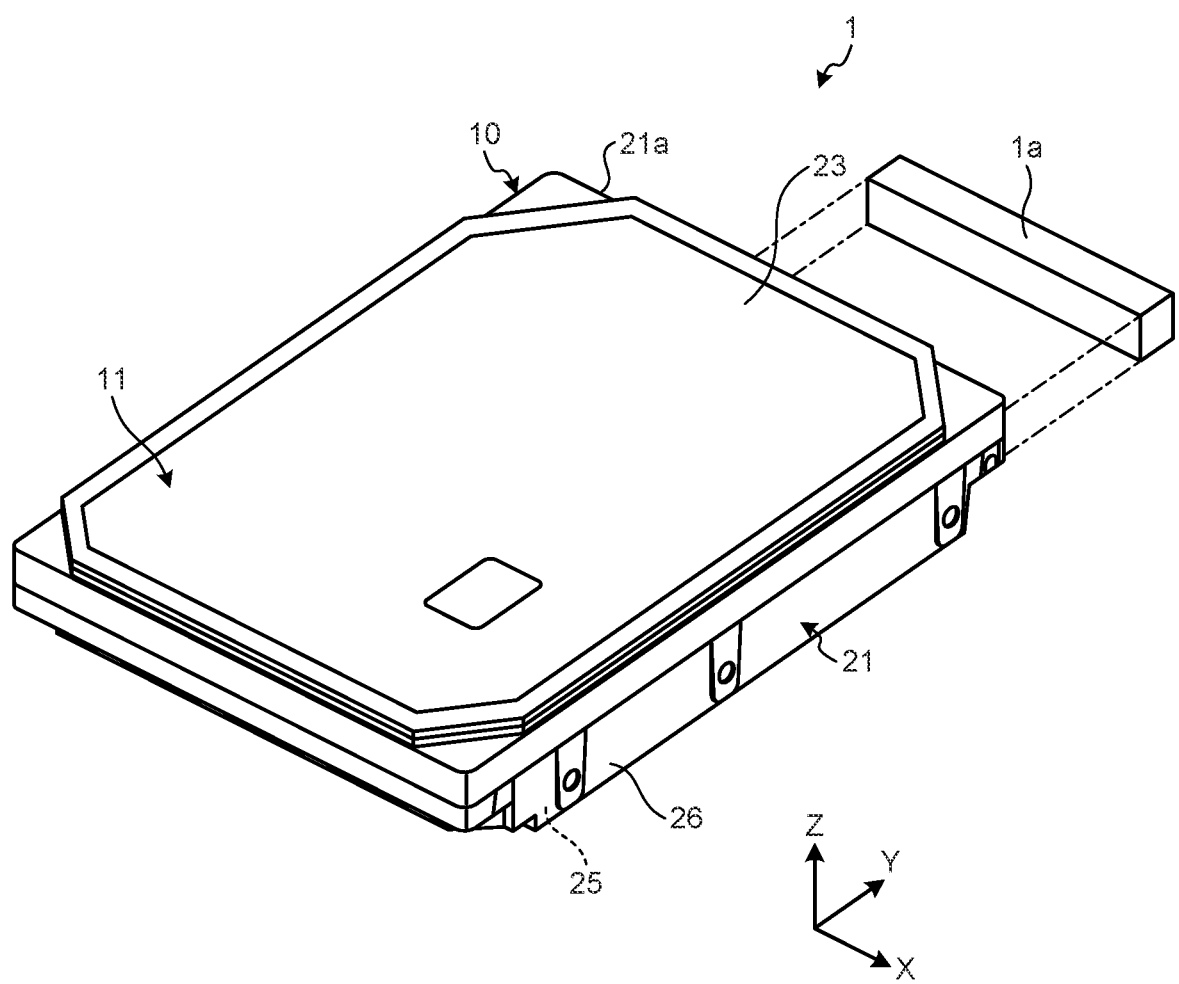
FIG. 1 is an exemplary perspective view illustrating a hard disk drive (HDD) according to one embodiment.

FIG. 1 is an exemplary perspective view illustrating a hard disk drive (HDD) 10 according to one embodiment. The HDD 10 is mounted on an external device 1, for example. The HDD 10 is an example of an electronic device, and may also be referred to as a storage device or a disk device. Note that the electronic device is not limited to the HDD 10, and may be a solid state drive (SSD) or other devices.

Examples of the external device 1 include various types of computers such as a personal computer, a supercomputer, a server, a television receiver, or a game machine, or devices such as an external hard drive (HDD). The external device 1 may also be referred to as a host device.

As illustrated in each of the drawings, in this disclosure an X-axis, a Y-axis, and a Z-axis are defined for the sake of convenience. The X-axis, the Y-axis, and the Z-axis are orthogonal to one another. The X-axis is along the width of the HDD 10. The Y-axis is along the length of the HDD 10. The Z-axis is along the thickness of the HDD 10.

In this disclosure X direction, Y direction and Z direction are also defined. The X direction is a direction along the X-axis, and includes a +X direction indicated by an X-axis arrow and a −X direction being a direction opposite to the X-axis arrow. The Y direction is a direction along the Y-axis and includes a +Y direction indicated by a Y-axis arrow and a −Y direction being a direction opposite to the Y-axis arrow. The Z direction is a direction along the Z-axis and includes a +Z direction indicated by a Z-axis arrow and a −Z direction being a direction opposite to the Z-axis arrow.

Figure 2:
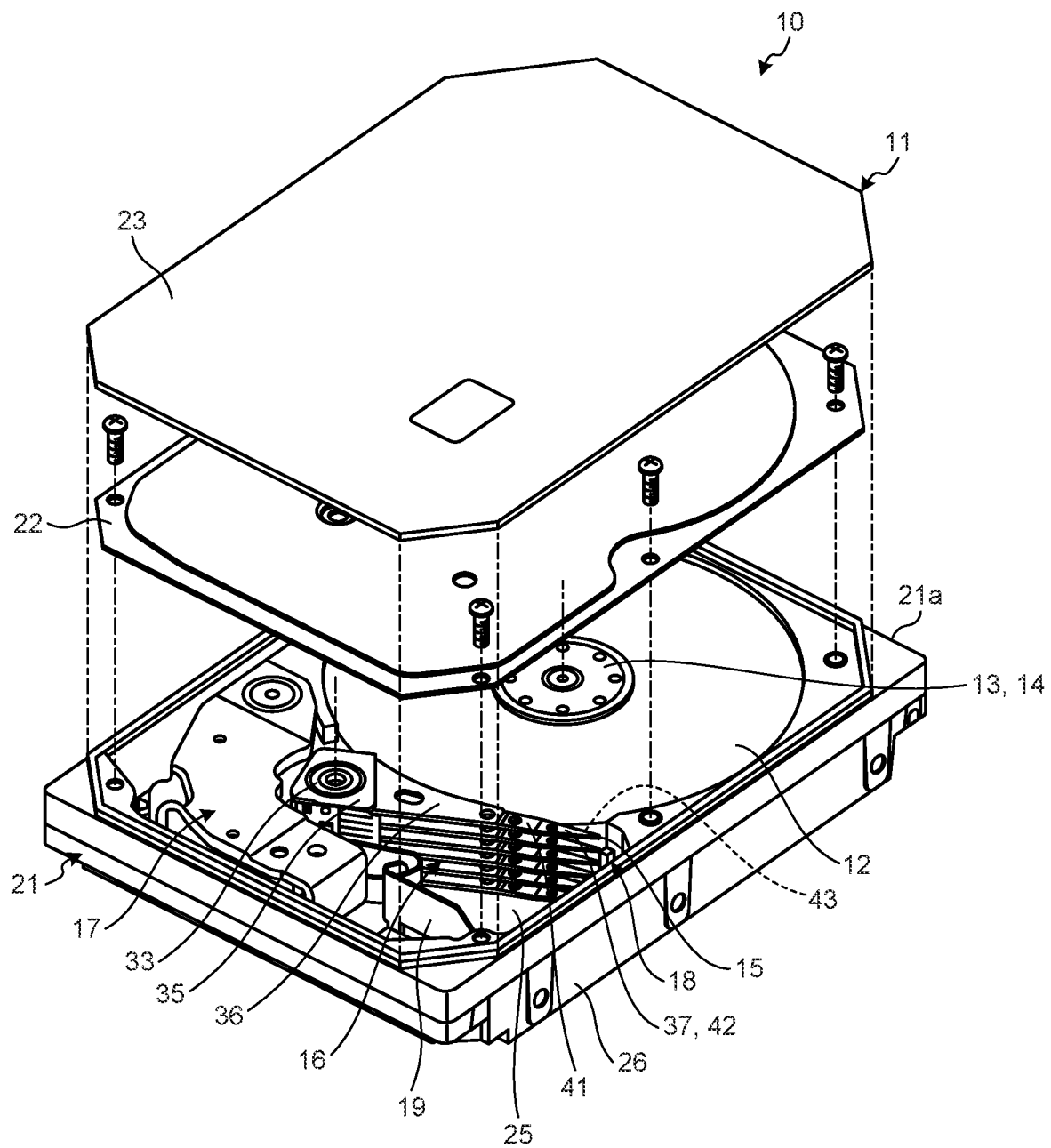
FIG. 2 is an exemplary exploded perspective view illustrating the HDD according to the embodiment.

FIG. 2 is an exemplary exploded perspective view illustrating the HDD 10 according to the present embodiment. As illustrated in FIG. 2, the HDD 10 includes a housing 11, a plurality of magnetic disks 12, a spindle motor 13, a clamp spring 14, a plurality of magnetic heads 15, an actuator assembly 16, a voice coil motor (VCM) 17, a ramp load mechanism 18, and a flexible printed circuit board (FPC) 19. The magnetic disks 12 are an example of a storage medium. The magnetic heads 15, the actuator assembly 16, and the FPC 19 are exemplary components.

The housing 11 includes a base 21, an inner cover 22, and an outer cover 23. The base 21 is a bottomed container and has a bottom wall 25 and a side wall 26. The bottom wall 25 is an example of a wall. The bottom wall 25 has a substantially rectangular (quadrangular) plate shape extending along an X-Y plane. The side wall 26 protrudes in the +Z direction from an outer edge of the bottom wall 25. For example, the bottom wall 25 and the side wall 26 are integrally formed of a metal material such as an aluminum alloy.

The inner cover 22 and the outer cover 23 are formed of a metal material such as an aluminum alloy, for example. The inner cover 22 is attached to an end of the side wall 26 in the +Z direction with screws, for example. The outer cover 23 is fixed to the end of the side wall 26 in the +Z direction by, for example, welding to cover the inner cover 22.

The housing 11 internally houses the magnetic disks 12, the spindle motor 13, the clamp spring 14, the magnetic heads 15, the actuator assembly 16, the voice coil motor 17, the ramp load mechanism 18, and the FPC 19. In the housing 11 the components are covered with the bottom wall 25 and the side wall 26 of the base 21, and the inner cover 22.

Each magnetic disk 12 is, for example, a disk including a magnetic recording layer on at least one of the upper surface and the lower surface. The diameter of the magnetic disk 12 is set to 3.5 inches, for example, but is not limited to this example.

The spindle motor 13 supports and rotates the magnetic disks 12 stacked at intervals. The clamp spring 14 holds the magnetic disks 12 on a hub of the spindle motor 13.

The magnetic heads 15 record and reproduce information on and from the recording layers of the corresponding magnetic disks 12. In other words, each magnetic head 15 reads and writes information from and to the magnetic disk 12. The magnetic disks 12 store written information by the magnetic heads 15. The magnetic heads 15 are supported by the actuator assembly 16.

The actuator assembly 16 is rotatably supported by a support shaft 33 disposed apart from the magnetic disks 12. The VCM 17 rotates the actuator assembly 16 to set the actuator assembly 16 in a desired position. The rotation of the actuator assembly 16 by the VCM 17 moves the magnetic head 15 to the outermost periphery of the magnetic disk 12, and then the ramp load mechanism 18 holds the magnetic head 15 in an unload position apart from the magnetic disk 12.

The actuator assembly 16 includes an actuator block 35, a plurality of arms 36, and a plurality of head suspension assemblies (suspensions) 37. The suspensions 37 may also be referred to as a head gimbal assembly (HGA).

The actuator block 35 is rotatably supported by the support shaft 33 via a bearing, for example. The plurality of arms 36 protrudes from the actuator block 35 in a direction substantially orthogonal to the support shaft 33. Note that the actuator assembly 16 may be divided to allow the arms 36 to protrude from the corresponding actuator blocks 35.

The arms 36 are arranged at intervals in a direction in which the support shaft 33 extends. The arms 36 have a plate shape to be able to enter the gap between the adjacent magnetic disks 12. The arms 36 extends substantially in parallel to each other.

The actuator block 35 and the arms 36 are integrally formed of aluminum, for example. Note that the material of the actuator block 35 and the arms 36 is not limited to this example.

A voice coil of the VCM 17 is mounted on a protrusion protruding from the actuator block 35. The VCM 17 includes a pair of yokes, a voice coil disposed between the yokes, and a magnet placed on the yokes.

The suspensions 37 are attached to a tip end of the corresponding arms 36 and protrude from the arms 36. Thus, the suspensions 37 are arranged at intervals in the direction in which the support shaft 33 extends.

Each of the suspensions 37 includes a base plate 41, a load beam 42, and a flexure 43. The magnetic heads 15 are attached to the suspensions 37.

The base plate 41 and the load beam 42 are formed of stainless steel, for example. The materials of the base plate 41 and the load beam 42 are not limited to this example. The base plate 41 is attached to a tip end of each arm 36. The load beam 42 has a plate shape thinner than the base plate 41. The load beam 42 is attached to the tip end of the base plate 41 and protrudes from the base plate 41.

The flexure 43 has an elongated strip shape. The shape of the flexure 43 is not limited to this example. The flexure 43 is a multi-layer plate including a metal plate (backing layer) such as stainless steel, an insulating layer formed on the metal plate, a conductive layer forming a plurality of wire arrangements (wiring patterns) on the insulating layer, and a protective layer (insulating layer) covering the conductive layer.

The flexure 43 includes, at one end, a displaceable gimbal (elastic support) located above the load beam 42. The magnetic head 15 is mounted on the gimbal. The other end of the flexure 43 is connected to the FPC 19. That is, the FPC 19 is electrically connected to the magnetic heads 15 via the wiring of the flexures 43.

Figure 3:
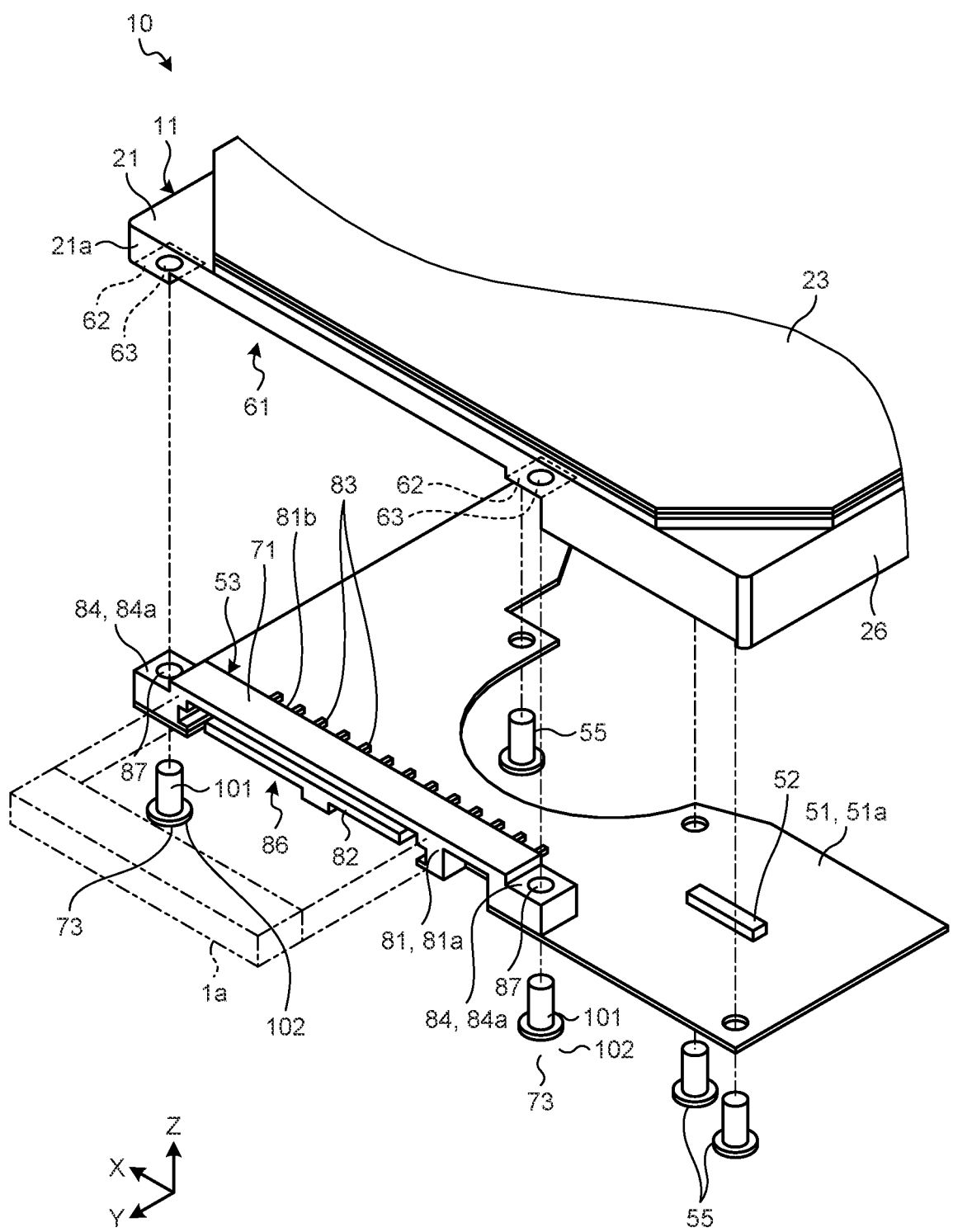
FIG. 3 is an exemplary partial exploded perspective view illustrating the HDD according to the embodiment.

FIG. 3 is an exemplary partial exploded perspective view illustrating the HDD 10 according to the present embodiment. As illustrated in FIG. 3, the HDD 10 further includes a printed circuit board (PCB) 51, a relay connector 52, and a connector module 53. The PCB 51 is an example of a substrate.

The PCB 51 is located outside the housing 11. Examples of the PCB 51 include, but are not limited to, a rigid substrate such as a glass epoxy substrate, a multilayer substrate, and a build-up substrate. The PCB 51 extends along the X-Y plane and is attached to the bottom wall 25 with a plurality of screws 55, for example. The PCB 51 may be attached to the bottom wall 25 by another method such as snap-fitting using a hook.

The relay connector 52 and the connector module 53 are mounted on the PCB 51 outside the housing 11. The PCB 51 may have additionally mounted thereon various memory devices such as RAM, ROM, and a buffer memory, a controller, a servo controller, a coil, a capacitor, and other electronic components.

The relay connector 52 is connected to the FPC 19 through a hole penetrating the bottom wall 25, for example. Thereby, the PCB 51 is electrically connected to the FPC 19 via the relay connector 52. Furthermore, the PCB 51 is electrically connected to the magnetic heads 15 via the relay connector 52, the FPC 19, and the flexures 43.

Figure 4:
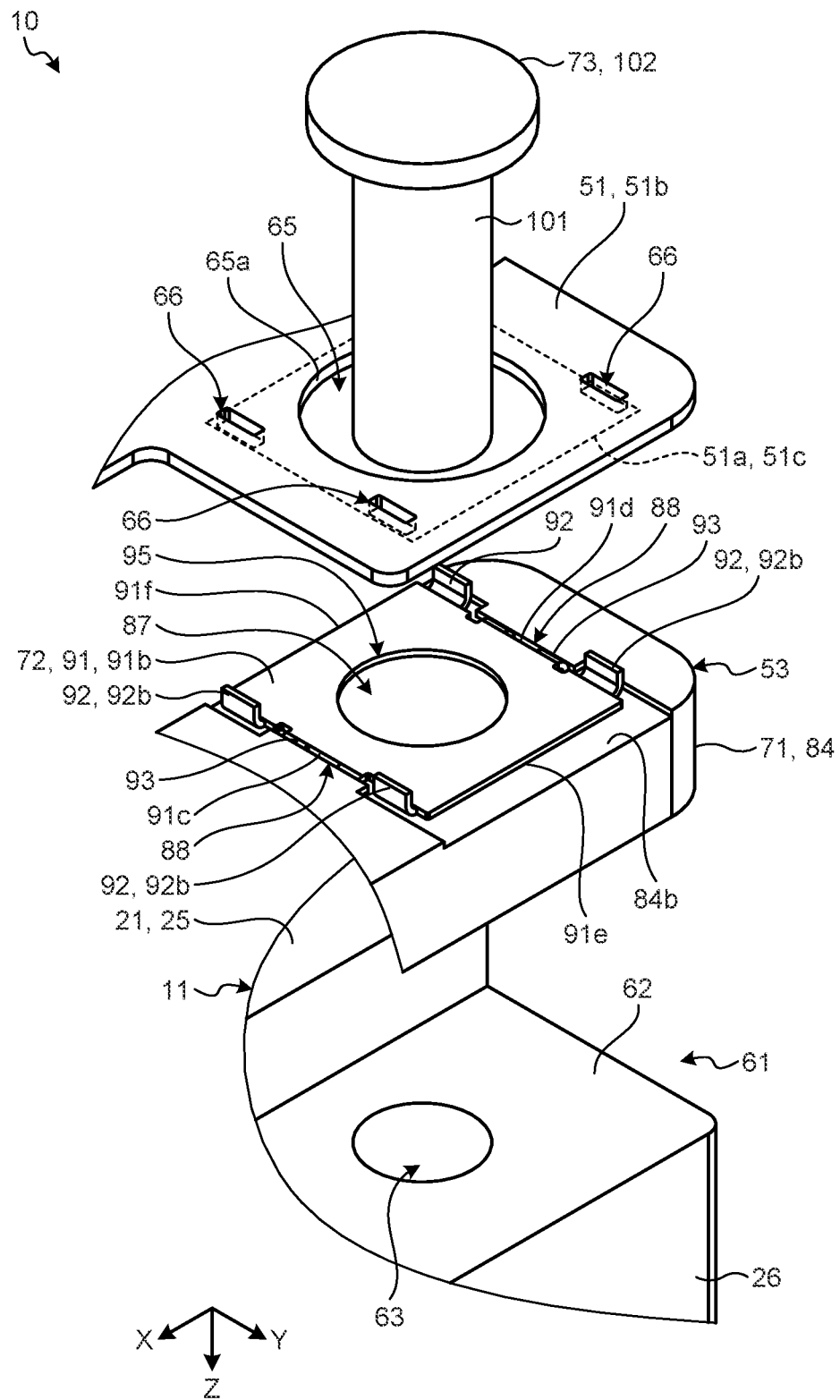
FIG. 4 is an exemplary perspective view illustrating a housing, a PCB, and a connector module according to the embodiment.
Figure 5:
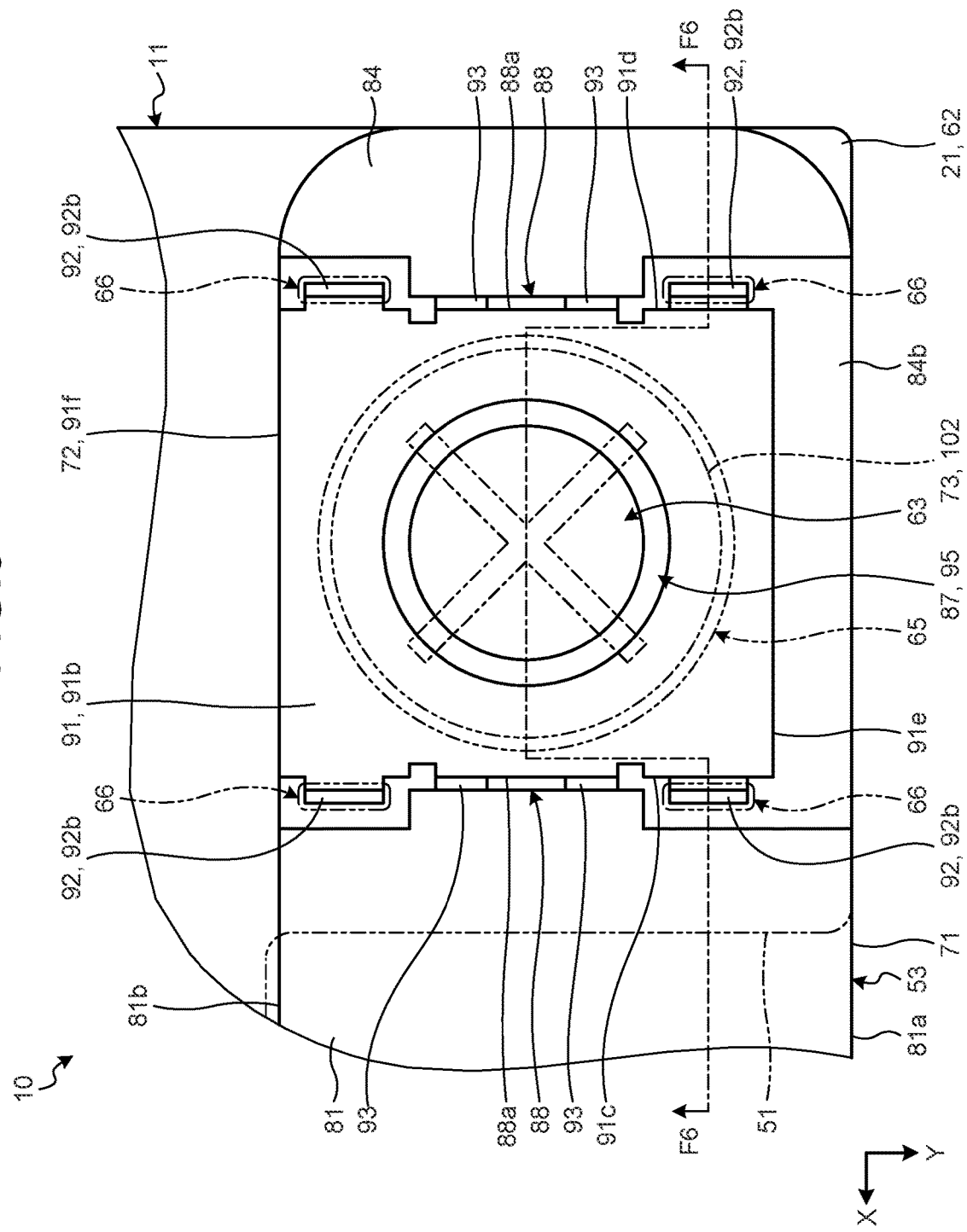
FIG. 5 is an exemplary plan view illustrating the connector module of the embodiment.
Figure 6:
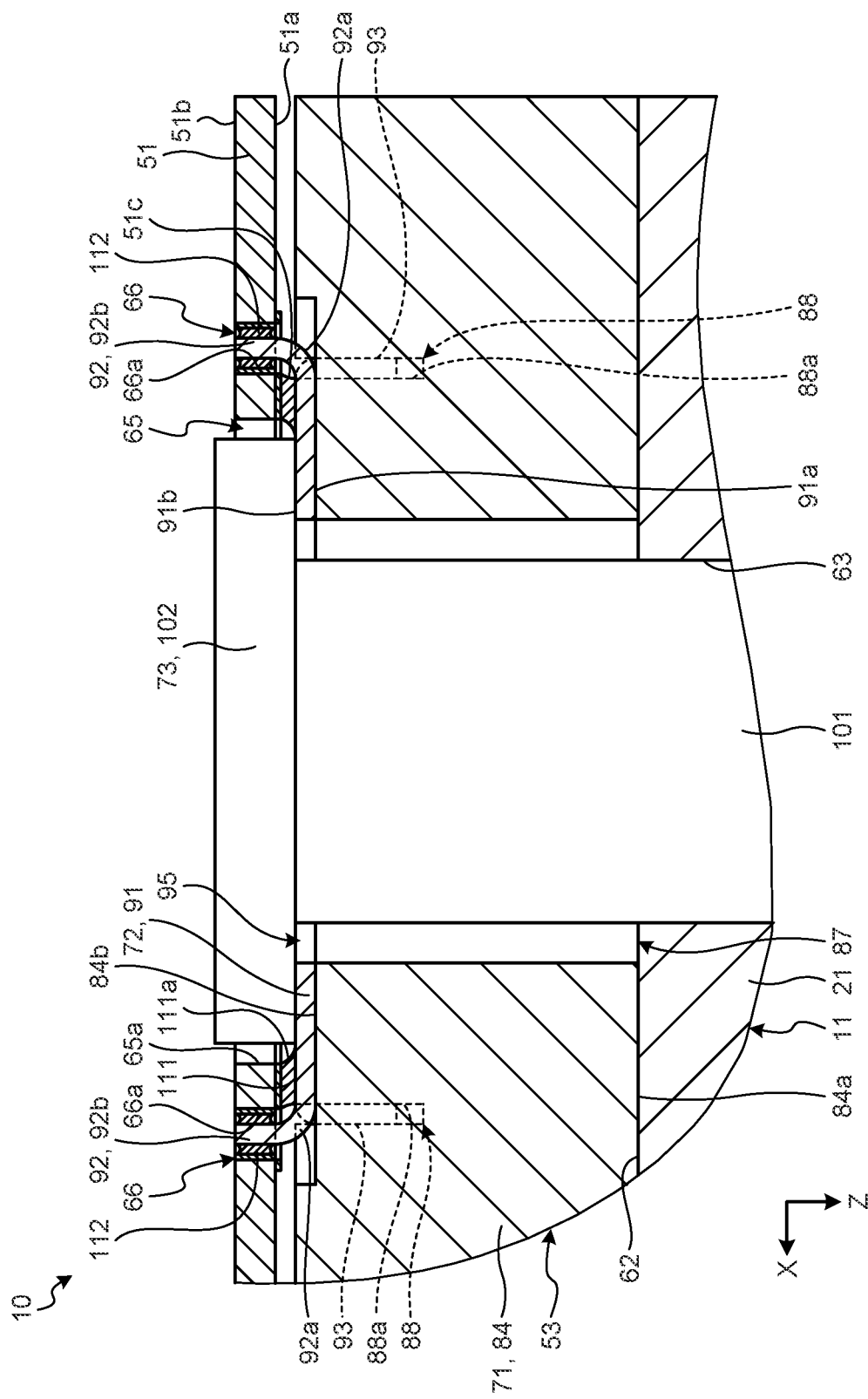
FIG. 6 is an exemplary cross-sectional view illustrating a part of the HDD of the embodiment taken along line F6-F6 of FIG. 5.

FIG. 4 is an exemplary perspective view illustrating the housing 11, the PCB 51, and the connector module 53 of the present embodiment. FIG. 5 is an exemplary plan view illustrating the connector module 53 of the present embodiment. FIG. 6 is an exemplary cross-sectional view of a part of the HDD 10 according to the present embodiment taken along line F6-F6 in FIG. 5. Hereinafter, the HDD 10 will be described in detail with reference to FIGS. 3 to 6.

As illustrated in FIG. 3, the base 21 is provided with a cutout 61. The cutout 61 is located at a corner of the bottom wall 25 and the side wall 26, and opens to an end 21a of the base 21 in the +Y direction.

The base 21 has two support surfaces 62. The support surfaces 62 are a part of the bottom surface of the cutout 61 in the +Z direction. The support surfaces 62 are also a part of the outer surface of the base 21 and faces the outside of the housing 11. For example, the support surfaces 62 are substantially flat along the X-Y plane and face the −Z direction. The support surfaces 62 are not limited to this example. The two support surfaces 62 are apart from each other in the X direction.

The base 21 is provided with two screw holes 63. The two screw holes 63 open in the two support surfaces 62 individually. The screw holes 63 have a substantially circular cross section and extend in substantially the +Z direction from the support surfaces 62. The screw holes 63 each include a female screw inside.

As illustrated in FIG. 6, the PCB 51 has an inner surface 51a and an outer surface 51b. The inner surface 51a is an example of a first surface. The inner surface 51a is substantially flat along the X-Y plane and faces the +Z direction. The inner surface 51a faces the bottom wall 25 and the support surfaces 62. The outer surface 51b is opposite to the inner surface 51a.

The inner surface 51a includes a metal region 51c. The metal region 51c is an example of a region. The metal region 51c corresponds to a part of the inner surface 51a not covered with the solder resist and exposing a metal layer of the PCB 51. That is, the metal region 51c is formed of metal.

The PCB 51 is provided with two penetrating holes 65 and eight through holes 66. The numbers of penetrating holes 65 and through holes 66 are not limited to this example. The penetrating hole 65 is an example of a first hole. The through hole 66 is an example of a second hole.

The penetrating holes 65 and the through holes 66 penetrate the PCB 51 in substantially the Z direction and open to the inner surface 51a and the outer surface 51b. In the present embodiment, the penetrating holes 65 and the through holes 66 open to the metal region 51c of the inner surface 51a. The through holes 66 may open to a portion of the inner surface 51a other than the metal region 51c.

As indicated by a two-dot chain line in FIG. 5, the penetrating hole 65 has a substantially circular cross section and is substantially concentric (coaxial) with the screw hole 63. In other words, the penetrating hole 65 is at substantially the same position as the screw hole 63 when viewed in the Z direction. The cross section of the penetrating hole 65 is orthogonal to the Z direction in which the penetrating hole 65 extends. The diameter of the penetrating hole 65 is longer than the outer diameter of the screw hole 63.

As indicated by a two-dot chain line in FIG. 5, each of the through holes 66 has a substantially rectangular cross section extending in substantially the Y direction. The through hole 66 may have a cross section of another shape such as a circular shape. The through holes 66 are apart from one another. In the present embodiment, four through holes 66 are arranged around one penetrating hole 65. The through holes 66 are also apart from the penetrating hole 65.

As illustrated in FIG. 6, the PCB 51 further includes inner surfaces 66a of the through holes 66. The inner surfaces 66a are formed by metal plating. In other words, the inner surfaces 66a are formed of metal. The plating forming the inner surface 66a is electrically connected to a ground pattern of the PCB 51, for example.

The connector module 53 illustrated in FIG. 4 includes an interface connector (I/F connector) 71, two attachment plates 72, and two screws 73. FIG. 4 illustrates one of the two attachment plates 72 and one of the two screws 73. The I/F connector 71 is an example of a connector. The attachment plate 72 is an example of a metal member.

The I/F connector 71 is a connector conforming to an interface standard such as Serial ATA (SATA). Alternatively, the I/F connector 71 may conform to Serial Attached SCSI (SAS), NVM Express (NVMe), or other interface standards.

As illustrated in FIG. 3, the I/F connector 71 includes a base 81, a terminal 82, a plurality of pins 83, and two attachment parts 84. The base 81 has a substantially rectangular parallelepiped shape extending in substantially the X direction. The base 81 is formed of an insulator such as synthetic resin, for example. Note that the base 81 is not limited to this example.

The base 81 is provided with a socket 86. The socket 86 is a recess opening to an end 81a of the base 81 in the +Y direction. The terminal 82 is disposed on the socket 86. The terminal 82 is a SATA-compliant communication and power supply terminal. The terminal 82 is not limited to this example.

The terminal 82 has a substantially rectangular plate shape (rectangular parallelepiped shape) extending in substantially the X direction. The terminal 82 extends inside the socket 86 in the +Y direction from the base 81. The +Y direction is an example of a first direction.

The I/F connector 71 is connected to an I/F connector 1a of the external device 1. For example, the I/F connectors 1a and 71 are fitted together, to thereby connect the terminal 82 of the I/F connector 71 to the I/F connector 1a.

The pins 83 protrude from an end 81b of the base 81 in the −Y direction, for example. The pins 83 are electrically connected to electrodes of the terminal 82. The pins 83 are electrically connected by solder to electrodes such as a pad or a through hole provided on the inner surface 51a of the PCB 51, for example. This allows the I/F connector 71 to be mounted on the PCB 51 outside the housing 11.

The two attachment parts 84 are disposed at both ends of the base 81 in the X direction. The attachment parts 84 have a substantially rectangular parallelepiped shape. The attachment parts 84 may have another shape. As illustrated in FIG. 6, the attachment parts 84 are located between the inner surface 51a of the PCB 51 and the support surface 62 of the base 21. Thus, penetrating holes 87, upper surfaces 84a, and lower surfaces 84b are also located between the inner surface 51a and the support surface 62.

Each attachment part 84 has an upper surface 84a and a lower surface 84b. In the present embodiment the terms "upper" and "lower" are defined with reference to the orientation of the HDD 10 in FIGS. 1 to 3 for the sake of convenience, and thus are not intended to limit orientation, positions or locations, usage modes, or other conditions.

The upper surface 84a is substantially flat along the X-Y plane and faces the +Z direction. The upper surface 84a faces the corresponding support surface 62 of the base 21. The lower surface 84b is opposite to the upper surface 84a. The lower surface 84b is substantially flat along the X-Y plane and faces the −Z direction. The lower surface 84b faces the inner surface 51a of the PCB 51.

Each of the two attachment parts 84 is provided with a penetrating hole 87 and two fitting holes 88. The penetrating hole 87 is an example of a third hole. The fitting hole 88 is an example of a fifth hole. As illustrated in FIG. 5, the penetrating hole 87 has a substantially circular cross section, and is substantially concentric (coaxial) with the screw hole 63 and the penetrating hole 65. In other words, the penetrating hole 87 is at substantially the same position as the screw hole 63 and the penetrating hole 65 when viewed in the Z direction. The diameter of the penetrating hole 87 is the same as or longer than the outer diameter of the screw hole 63. The diameter of the penetrating hole 87 is shorter than the diameter of the penetrating hole 65.

Each of the two fitting holes 88 has a substantially rectangular cross section extending in the substantially Y direction. The fitting hole 88 may have a cross section of another shape. The two fitting holes 88 are apart from each other in the X direction. The penetrating hole 87 is located between the two fitting holes 88. In the Y direction each fitting hole 88 is located between the two through holes 66.

As illustrated in FIG. 6, the upper surface 84a of the attachment part 84 comes in contact with the corresponding support surface 62. This allows the penetrating hole 87 of the attachment part 84 to communicate with the screw hole 63 of the base 21. There may be a gap or another object between the upper surface 84a and the support surface 62.

The attachment plates 72 are formed of a pressed metal plate, for example. As illustrated in FIG. 5, each of the two attachment plates 72 includes a plate 91, four reinforcing protrusions 92, and four fitting protrusions 93. The attachment plates 72 are not limited to this example. The plate 91 is an example of a wall. The reinforcing protrusion 92 is an example of a joint and a second protrusion. The fitting protrusion 93 is an example of a first protrusion.

The plate 91 is substantially quadrangular (rectangular parallelepiped shape) extending along the X-Y plane. The plate 91 has an upper surface 91a and a lower surface 91b as illustrated in FIG. 6 and four side surfaces 91c, 91d, 91e, and 91f as illustrated in FIG. 5. The lower surface 91b is an exemplary second surface. The side surface 91c is an example of an edge and a first edge. The side surface 91d is an example of an edge and a second edge. The side surface 91e is an example of an edge and a third edge. The side surface 91f is an example of an edge and a fourth edge.

As illustrated in FIG. 6, the upper surface 91a is substantially flat along the X-Y plane and faces the +Z direction. The upper surface 91a faces the lower surface 84b of the corresponding attachment part 84. The lower surface 91b is opposite to the upper surface 91a. The lower surface 91b is substantially flat along the X-Y plane and faces the −Z direction. The lower surface 91b faces the inner surface 51a of the PCB 51. At least a part of the lower surface 91b faces the metal region 51c of the inner surface 51a.

As illustrated in FIG. 5, the four side surfaces 91c, 91d, 91e, and 91f form the edge of the plate 91 having a rectangular parallelepiped shape. The four side surfaces 91c, 91d, 91e, and 91f are located between the edge of the upper surface 91a and the edge of the lower surface 91b.

The side surfaces 91c and 91d extend in the Y direction (+Y direction and −Y direction). The side surfaces 91c and 91d may extend in different directions or may have irregularities. The side surface 91c faces the +X direction. The side surface 91d is opposite to the side surface 91c and faces the −X direction.

The side surfaces 91e and 91f extend in the X direction. The side surfaces 91e and 91f may extend in different directions or may have irregularities. The side surface 91e extends between an end of the side surface 91c in the +Y direction and an end of the side surface 91d in the +Y direction, and faces the +Y direction. The side surface 91f is opposite to the side surface 91e. The side surface 91f extends between an end of the side surface 91c in the −Y direction and an end of the side surface 91d in the −Y direction, and faces the −Y direction. The −Y direction is an example of a second direction. As described above, all of the four side surfaces 91c, 91d, 91e, and 91f face the direction intersecting the −Z direction that the lower surface 91b faces.

The plate 91 is provided with a penetrating hole 95. The penetrating hole 95 is an example of a fourth hole. The penetrating hole 95 penetrates the plate 91 in substantially the Z direction and opens to the upper surface 91a and the lower surface 91b.

The penetrating hole 95 has a substantially circular cross section and is substantially concentric (coaxial) with the screw hole 63 and the penetrating holes 65 and 87. In other words, the penetrating hole 95 is at substantially the same position as the screw hole 63 and the penetrating holes 65 and 87 when viewed in the Z direction. The diameter of the penetrating hole 95 is the same as or longer than the outer diameter of the screw hole 63. The diameter of the penetrating hole 95 is shorter than the diameter of the penetrating hole 65.

As illustrated in FIG. 6, the plate 91 is disposed on the lower surface 84b of the corresponding attachment part 84. Thus, the upper surface 91a of the plate 91 is in contact with the lower surface 84b of the attachment part 84. There may be a gap or another object between the upper surface 91a and the lower surface 84b. Furthermore, the plate 91 is located between the inner surface 51a of the PCB 51 and the support surface 62 of the base 21. That is, the penetrating hole 95, the upper surface 91a, and the lower surface 91b are also located between the inner surface 51a and the support surface 62.

The penetrating hole 95 of the plate 91 communicates with the penetrating hole 87 of the attachment part 84. This allows the penetrating hole 87 to communicate with the screw hole 63 and the penetrating hole 95. The penetrating hole 95 of the plate 91 also communicates with the penetrating hole 65 of the PCB 51 through a gap.

As illustrated in FIG. 5, the reinforcing protrusions 92 protrude from the two side surfaces 91c and 91d. For example, two of the reinforcing protrusions 92 protrude from the side surface 91c while the other two reinforcing protrusions 92 protrude from the side surface 91d. No reinforcing protrusions 92 are however provided on the side surfaces 91e and 91f. Note that the reinforcing protrusions 92 are not limited to this example.

The two reinforcing protrusions 92 protrude from the side surface 91c apart from each other in the Y direction. The two reinforcing protrusions 92 protrude from the side surface 91d apart from each other in the Y direction. Thus, the four reinforcing protrusions 92 are apart from one another.

Two of the four reinforcing protrusions 92 are located in the vicinity of the side surface 91e. That is, the two reinforcing protrusions 92 are closer to the side surface 91e than to the centers of the side surfaces 91c and 91d. The other two of the four reinforcing protrusions 92 are located in the vicinity of the side surface 91f. Thus, the two reinforcing protrusions 92 are closer to the side surface 91f than to the centers of the side surfaces 91c and 91d.

The reinforcing protrusions 92 are formed by bending a part of a metal plate to become the plate 91, for example. As illustrated in FIG. 6, each of the reinforcing protrusions 92 includes: a connect 92a connected to the side surfaces 91c and 91d; and an extension 92b extending in the −Z direction from the connect 92a. The extension 92b has a substantially rectangular plate shape (rectangular parallelepiped shape) extending along the Y-Z plane.

The extension 92b of the reinforcing protrusion 92 is inserted into the corresponding through hole 66. In the present embodiment, the extension 92b does not protrude from the outer surface 51b of the PCB 51. In other words, in the Z direction, the end of the reinforcing protrusion 92 in the −Z direction is closer to the plate 91 than to the outer surface 51b of the PCB 51. With this arrangement, the reinforcing protrusion 92 does not cause increase in the thickness of the HDD 10 in the Z direction. Note that the extension 92b may protrude from the outer surface 51b of the PCB 51.

In the cross section orthogonal to the Z direction in which the through hole 66 extends, as illustrated in FIG. 5, the extension 92b has a substantially rectangular cross section extending in the Y direction. The cross section of the extension 92*b* is smaller than the cross section of the through hole 66.

The fitting protrusions 93 protrude from the two side surfaces 91*c* and 91*d*. For example, two of the fitting protrusions 93 protrude from the side surface 91*c* while the other two fitting protrusions 93 protrude from the side surface 91*d*. No fitting protrusions 93 are however provided on the side surfaces 91*e* and 91*f*. The fitting protrusions 93 are not limited to this example.

The two fitting protrusions 93 protrude from the side surface 91*c* apart from each other in the Y direction and are located between the two reinforcing protrusions 92 protruding from the side surface 91*c*. Likewise, the two fitting protrusions 93 protrude from the side surface 91*d* apart from each other in the Y direction and are located between the two reinforcing protrusions 92 protruding from the side surface 91*d*. Thus, the reinforcing protrusions 92 and the fitting protrusions 93 are apart from each other.

The fitting protrusions 93 are formed by bending a part of a metal plate to become the plate 91, for example. Each of the fitting protrusions 93 extends in the −Z direction from the side surfaces 91*c* and 91*d*. The fitting protrusion 93 has a substantially rectangular plate shape (rectangular parallelepiped shape) extending along the Y-Z plane. In a cross section orthogonal to the Z direction, the fitting protrusion 93 has a substantially rectangular cross section extending in the Y direction.

As indicated by a broken line in FIG. 6, the fitting protrusions 93 are inserted into the corresponding fitting holes 88 of the attachment part 84. By insertion of the fitting protrusions 93 into the fitting holes 88, the attachment plate 72 is attached to the I/F connector 71.

For example, the fitting protrusions 93 come in contact with inner surfaces 88*a* of the fitting holes 88. While the attachment plate 72 is apart from the I/F connector 71, the distance between the inner surfaces 88*a* of the two fitting holes 88 is slightly longer than the distance between the fitting protrusions 93 protruding from the side surface 91*c* and the fitting protrusions 93 protruding from the side surface 91*d*. Because of this, the fitting protrusions 93 are press-fitted into the fitting holes 88.

The fitting protrusions 93 protruding from the side surface 91*c* and the fitting protrusions 93 protruding from the side surface 91*d* hold the attachment part 84 in-between them. Thereby, the attachment plate 72 is fixed to the I/F connector 71. Note that the attachment plate 72 may be attached to the I/F connector 71 by another method such as insert molding.

Each of the two screws 73 includes a screw shaft 101 and a screw head 102. The screw shaft 101 has a substantially columnar shape extending in substantially the Z direction, and has a male screw threaded on its outer surface. The screw head 102 is located at an end of the screw shaft 101 in the −Z direction.

The screw head 102 has, for example, a columnar shape extending in substantially the Z direction or a substantially hemispherical shape protruding in the −Z direction. The diameter of the screw head 102 is longer than the outer diameter of the screw shaft 101. Furthermore, the diameter of the screw head 102 is longer than the diameters of the penetrating holes 87 and 95.

The screw shaft 101 is fitted into the screw hole 63 of the base 21 through the penetrating hole 95 of the plate 91 and the penetrating hole 87 of the attachment part 84. In other words, the screw shaft 101 is coupled to the housing 11 through the penetrating holes 87 and 95.

The screw head 102 is at least partially housed in the penetrating hole 65 of the PCB 51. The diameter of the screw head 102 is shorter than the diameter of the penetrating hole 65. That is, the screw head 102 is apart from an edge 65*a* of the penetrating hole 65.

The screw head 102 comes in contact with the lower surface 91*b* of the plate 91. This allows the screw 73 to pass through the I/F connector 71 and the penetrating holes 87 and 95 of the attachment plate 72 to attach the I/F connector 71 and the attachment plate 72 to the housing 11. Note that there may be a gap, solder, or another object between the screw head 102 and the lower surface 91*b*.

The attachment plate 72 is soldered to the PCB 51. The HDD 10 further includes solder 111 and 112. The solder 111 is an example of first solder. The solder 112 is an example of second solder. The solder 111 and 112 are, for example, lead-free solder but may be other types of solder.

The solder 111 adheres to both the metal region 51*c* of the PCB 51 and the lower surface 91*b* of the plate 91. Thereby, the solder 111 spreads between the opposing metal region 51*c* and lower surface 91*b* so as to join the metal region 51*c* and the lower surface 91*b* to each other.

The solder 111 includes a fillet 111*a* that smoothly spreads between the edge 65*a* of the penetrating hole 65 and the lower surface 91*b* of the plate 91. The fillet 111*a* expands in a tapered manner from the metal region 51*c* of the PCB 51 toward the lower surface 91*b* of the plate 91.

On the lower surface 91*b* of plate 91, the fillet 111*a* is longer in diameter than the screw head 102. Because of this, the screw head 102 is separated from the solder 111. Note that the solder 111 may adhere to the screw head 102.

The solder 112 is supplied to the inside of the through hole 66 and adheres to the inner surface 66*a* of the through hole 66 and the extension 92*b* of the reinforcing protrusion 92. Thereby, the solder 112 spreads between the inner surface 66*a* of the through hole 66 and the extension 92*b* so as to join the inner surface 66*a* of the through hole 66 and the reinforcing protrusion 92 to each other. Note that the solder 112 may be integrated with the solder 111.

As described above, the PCB 51 is attached to the housing 11 with the screws 55. In addition, the I/F connector 71 and the attachment plate 72 are attached to the housing 11 with the screws 73.

The pins 83 of the I/F connector 71 are soldered to the electrodes of the PCB 51. The attachment plate 72 attached to the I/F connector 71 is joined to the PCB 51 by the solder 111, 112. This works to reinforce a solder-connected portion between the pins 83 of the I/F connector 71 and the electrodes of the PCB 51.

For example, in connecting the I/F connector 71 to the I/F connector 1*a* of the external device 1, the I/F connector 71 may receive vibration from the external device 1. In the case of the I/F connector 71 attached to the housing 11, vibration is transmitted from the I/F connector 71 to the housing 11. This can reduce transmission of the vibration from the I/F connector 71 to the PCB 51. This further leads to a shortened distance between the position where the I/F connector 71 is attached to the housing 11 and the external device 1 being a source of vibration, thereby decreasing the amplitude of vibration of the I/F connector 71. By decreasing the vibration of the I/F connector 71 and the transmission of vibration from the I/F connector 71 to the PCB 51, the HDD 10 can be avoided from performance degradation due to vibration.

For another example, a change in temperature may cause stress to the solder 111 and 112. As a typical example, the stress may cause creep fracture in the solder. According to the present embodiment, however, the solder 111 works to join the metal region 51c and the plates 91 together as well as the solder 112 works to join the reinforcing protrusions 92 and the inner surfaces 66a of the through holes 66 together. This can disperse the stress occurring on the solder 111 and 112, smoothening the stress distribution on the solder 111 and 112.

In the HDD 10 according to the present embodiment described above, the PCB 51 has the inner surface 51a and the metal region 51c provided on the inner surface 51a. The PCB 51 is provided with the penetrating holes 65 open to the metal region 51c and the through holes 66 open to the inner surface 51a. The PCB 51 is attached to the housing 11 outside the housing 11, and is electrically connected to the magnetic heads 15 housed in the housing 11. The I/F connector 71 is provided with the penetrating holes 87, mounted on the PCB 51 outside the housing 11 and configured to be connected to the external device 1. Each attachment plate 72 has the lower surface 91b facing the metal region 51c and the reinforcing protrusions 92 inserted into the through holes 66. The attachment plate 72 is provided with the penetrating hole 95 that opens to the lower surface 91b and communicates with the penetrating holes 65 and 87. The attachment plates 72 are attached to the I/F connector 71. The screws 73 pass through the penetrating holes 87 and 95 to attach the I/F connector 71 and the attachment plates 72 to the housing 11. The solder 111 joins the metal region 51c of the PCB 51 and the lower surfaces 91b of the attachment plates 72 to each other. The solder 112 joins metal inner surfaces 66a of the through holes 66 of the PCB 51 and the reinforcing protrusions 92 of the attachment plates 72 to each other. Thereby, the attachment plates 72 attached to the I/F connector 71 are joined to the PCB 51 by not only the solder 111 joining the metal region 51c with the lower surfaces 91b but also the solder 112 joining the inner surfaces 66a of the through holes 66 with the reinforcing protrusions 92. This makes it possible for the HDD 10 according to the present embodiment to distribute the stress to the solder 111 and the solder 112, if it occurs, leading to improvement in the durability of the solder (the solder 111 and the solder 112) joining the I/F connector 71 with the PCB 51. For example, the HDD 10 of the present embodiment can reduce the occurrence of creep fracture in the solder 111, 112.

The penetrating holes 87 of the I/F connector 71 and the penetrating holes 95 and the lower surfaces 91b of the attachment plates 72 are located between the housing 11 and the PCB 51. Each screw 73 includes: the screw shaft 101 coupled to the housing 11 through the penetrating holes 87 and 95; and the screw head 102 to come in contact with the lower surface 91b. That is, the attachment plate 72 works as a washer to support the screw head 102 of the screw 73. This allows the screw 73 to stably attach the I/F connector 71 and the attachment plate 72 to the housing 11.

The screw head 102 is at least partially housed in the penetrating hole 65 and is apart from the edge 65a of the penetrating hole 65. According to the HDD 10 of the present embodiment, thus, the screw head 102 can less protrude to the outside of the HDD 10, leading to avoiding an increase in the thickness of the HDD 10.

The solder 111 adheres to the metal region 51c and the lower surface 91b and may form the fillet 111a spreading across the lower surface 91b. The fillet 111a strengthens the joint between the metal region 51c and the lower surface 91b. However, the screw head 102 may run on the fillet 111a and further protrude to the outside of the HDD 10. In contrast, the screw head 102 of the present embodiment is set apart from the solder 111. That is, the screw head 102 is prevented from running on the solder 111. Therefore, according to the HDD 10 of the present embodiment, the screw head 102 less protrudes to the outside of the HDD 10, leading to avoiding an increase in the thickness of the HDD 10.

The I/F connector 71 is provided with the fitting holes 88. The through holes 66 are open to the inner surface 51a. The attachment plate 72 includes the plate 91, the side surfaces 91c, 91d, 91e, and 91f of the plate 91, and the fitting protrusions 93. The plate 91 has the lower surface 91b. The side surfaces 91c, 91d, 91e, and 91f of the plate 91 face in a direction intersecting the direction in which the lower surface 91b faces. The fitting protrusions 93 protrude from the side surfaces 91c and 91d and are inserted into the fitting holes 88, thereby attaching the attachment plate 72 to the I/F connector 71. The reinforcing protrusions 92 protrude from the side surfaces 91c and 91d apart from each other, and are inserted into the through holes 66 and joined to the metal inner surfaces 66a of the through holes 66 by the solder 112. Each fitting protrusion 93 is located between two of the reinforcing protrusions 92. In the HDD 10 according to the present embodiment, by fitting the mutually separate reinforcing protrusions 92 to the PCB 51, the I/F connector 71 and the PCB 51 can be more firmly joined together. Furthermore, the attachment plate 72 is attached to the I/F connector 71 by inserting the fitting protrusions 93 into the fitting holes 88 without using screws or solder. The HDD 10 of the present embodiment can be thus avoided from increasing in thickness due to the screws 73 or solder. Furthermore, each fitting protrusion 93 is located between the two reinforcing protrusions 92, which results in decreasing unevenness of stress on the fitting protrusions 93 and the reinforcing protrusions 92.

The attachment plate 72 has the side surfaces 91c, 91d, 91e, and 91f. The side surface 91c extends in the +Y direction. The side surface 91d is opposite the side surface 91c. The side surface 91e extends between an end of the side surface 91c in the +Y direction and an end of the side surface 91d in the +Y direction. The side surface 91f extends between an end of the side surface 91c in the −Y direction opposite to the +Y direction and an end of the side surface 91d in the −Y direction. The reinforcing protrusions 92 protrude from the side surface 91c and the side surface 91d but not from the side surfaces 91e or 91f. In the HDD 10 according to the present embodiment the reinforcing protrusions 92 are provided in a balanced manner to be able to avoid stress from unevenly acting on the reinforcing protrusions 92, if it occurs. In addition, the attachment plate 72 can be prevented from increasing in length in the Y direction.

The fitting protrusions 93 protrude from the side surface 91c and are each located between two of the reinforcing protrusions 92 protruding from the side surface 91c. With this arrangement, in the HDD 10 of the present embodiment the attachment plate 72 can be prevented from increasing in length in the Y direction.

The I/F connector 71 includes the terminal 82 configured to extend in the +Y direction and be connected to the external device 1. Thus, in attaching or detaching the I/F connector 71 to or from the external device 1, the I/F connector 71 is subjected to a force in the +Y direction or the −Y direction. Meanwhile, in the cross section orthogonal to the direction in which the through holes 66 extend, the fitting protrusions 93 and the reinforcing protrusions 92 all extend in the +Y direction. Thereby, the fitting protrusions 93 and the reinforcing protrusions 92 can work to prevent the I/F connector 71 from being deformed at the time of attachment or detachment of the I/F connector 71 to or from the external device 1.

In the above description, suppression is defined as, for example, preventing an occurrence of an event, an action, or an influence, or decreasing the degree of the event, the action, or the influence.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
   a housing that houses a component;
   a substrate with a first hole and a second hole, including
      a first surface to which the second hole opens, and
      a metal region being provided on the first surface and to which the first hole opens,
   the substrate being attached to the housing outside the housing and electrically connected to the component;
   a connector with a third hole, mounted on the substrate outside the housing and configured to be connected to an external device;
   a metal member with a fourth hole communicating with the first hole and the third hole, the metal member being attached to the connector and including
      a second surface facing the metal region and to which the fourth hole opens, and
      a joint inserted into the second hole;
   a screw that attaches the connector and the metal member to the housing through the third hole and the fourth hole;
   first solder that joins the metal region and the second surface to each other; and
   second solder that joins a metal inner surface of the second hole and the joint to each other.

2. The electronic device according to claim 1,
   wherein the third hole, the fourth hole, and the second surface are located between the housing and the substrate, and
   the screw includes:
   a screw shaft coupled to the housing through the third hole and the fourth hole; and
   a screw head that comes in contact with the second surface.

3. The electronic device according to claim 2,
   wherein the screw head is at least partially housed in the first hole and is apart from an edge of the first hole.

4. The electronic device according to claim 2,
   wherein the screw head is apart from the first solder.

5. The electronic device according to claim 1,
   wherein the connector is provided with a fifth hole;
   the second hole includes a plurality of second holes open to the first surface,
   the metal member includes:
      a wall having the second surface;
      an edge of the wall facing a direction intersecting with a direction in which the second surface faces; and
      a first protrusion protruding from the edge,
   the first protrusion attaches the metal member to the connector by being inserted into the fifth hole,
   the joint includes a plurality of second protrusions protruding from the edge apart from each other, and inserted into the plurality of second holes and joined to metal inner surfaces of the plurality of second holes by the second solder, and
   the first protrusion is located between two of the plurality of second protrusions.

6. The electronic device according to claim 5,
   wherein the edge includes:
   a first edge extending in a first direction;
   a second edge opposite the first edge;
   a third edge extending between an end of the first edge in the first direction and an end of the second edge in the first direction; and
   a fourth edge extending between an end of the first edge in a second direction opposite to the first direction and an end of the second edge in the second direction, and
   the plurality of second protrusions protrudes from the first edge and the second edge but not from the third edge and the fourth edge.

7. The electronic device according to claim 6,
   wherein the first protrusion protrudes from the first edge and is located between two second protrusions protruding from the first edge, among the plurality of second protrusions.

8. The electronic device according to claim 6,
   wherein the connector includes a terminal extending in the first direction and configured to be connected to the external device, and
   the first protrusion and the plurality of second protrusions extend in the first direction in a cross section orthogonal to a direction in which the second hole extends.

9. The electronic device according to claim 1, further comprising
   a storage medium capable of storing information and housed in the housing.

10. The electronic device according to claim 9,
    wherein the storage medium comprises a magnetic disk, and
    the component comprises a magnetic head capable of reading and writing information from and to the magnetic disk.

* * * * *